M. GRÜNZWEIG.
HEATING AND MOLDING SUBDIVIDED CORK.
APPLICATION FILED DEC. 3, 1907.
997,056.
Patented July 4, 1911.
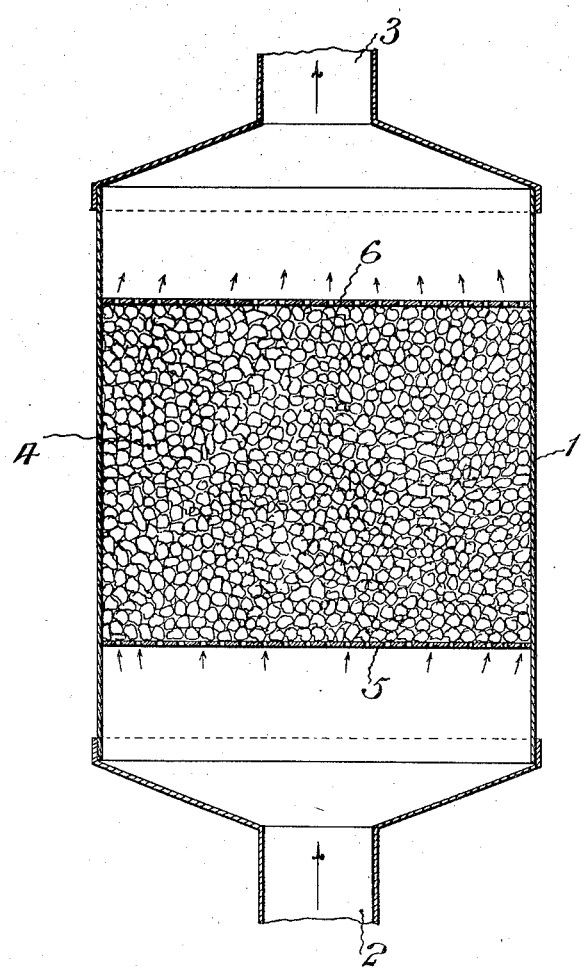

UNITED STATES PATENT OFFICE.

MAX GRÜNZWEIG, OF LUDWIGSHAFEN-ON-THE-RHINE, GERMANY.

HEATING AND MOLDING SUBDIVIDED CORK.

997,056.  Specification of Letters Patent.  Patented July 4, 1911.

Application filed December 3, 1907. Serial No. 404,961.

*To all whom it may concern:*

Be it known that I, MAX GRÜNZWEIG, student of chemistry and a subject of the German Emperor, and resident of Ludwigshafen-on-the-Rhine, in the Kingdom of Bavaria, Germany, (whose post-office address is Jaegerstrasse No. 11,) have invented new and useful Improvements Relating to Heating and Molding Subdivided Cork, of which the following is a specification.

The object of the invention is the manufacture of cork objects of any kind, as cork bricks, cork plates and the like.

The present process depends on the fact that when cork is subjected to a suitably high temperature, it suffers not only a change in volume but also a chemical change, while at the same time loose particles of cork can be united to a solid mass.

By heating the air inclosed in the cork cells and by evaporating the moisture from the cork, a pressure is exerted on the cell wall, highly plaited by nature, to which the wall yields, having lost its elasticity by the action of the heat, so that the whole cell is blown out. As the pressure in the cell and the pliability of the cell wall increases with the temperature, the degree of temperature is the sole factor for the increase of volume of the cork.

It is known that when cork is boiled in water it increases in volume by about 30 per cent., and that when boiled with linseed oil and resin the specific gravity of cork decreases by about 50 per cent. On the other hand, direct measurements of volume have shown that in other media, such as air, assuming that the pressure is not higher than that of the atmosphere, or where possible lower than this, a much greater expansion of the cork cells is possible. Since, however, in air and other gases containing oxygen when heated to about 200° C. cork begins to decompose with emission of an odor of burning and to carbonize while in liquids the cell walls, which are flabby at a high temperature, cannot stand the pressure due to the column of liquid and so collapse, it is advisable when using gases and vapors to select those which are as free as possible from oxygen. Superheated steam may be used to advantage. By this method of heating the resin and other volatile components contained in the cork are for the greater part also volatilized, so that the cork loses its hardness. The product obtained is a cork of considerably lower specific gravity. If the heating is conducted in a closed vessel, the separate cork particles unite together firmly and adhere to each other even after the natural binding medium such as cork resin has been expelled.

The uniform heating of cork throughout its whole mass offers great difficulty if heat is supplied only from without, for the heating occupies an extraordinarily long time. According to the present invention the heating is effected by a gas or fluid which is driven through the mass of cork. This mode is also the best for securing exclusion of oxygen, and serves well even at a temperature below 200° C. To hasten the process it is advisable to cool subsequently by passing a gas or fluid, for which purpose, below 100° C. air can be used. For heating, superheated steam may be used or a fluid which can serve at the same time to impregnate the cork, such as pitch. This can be sucked through, which is of advantage when small pieces are being made, or can be pressed through when heavy or compressed cork is to be produced. It is necessary however not to use too high a temperature, since otherwise as above mentioned, the flabby cell wall cannot withstand the pressure of the column of liquid, while at temperatures below 200° C. by using liquids the said double effect is obtained.

The accompanying drawing illustrates in section an apparatus for carrying out the above described process and consists of a casing 1 which may be cylindrical in form and provided with contracted inlet and outlet openings 2 and 3, the cork pieces 4 being retained between perforated walls 5 and 6 within the casing 1, so that the heating agent may be forced or drawn in at one end of the casing and out at the opposite end and caused to pass through the perforated walls 5 and 6 and through the body of cork pieces held between them.

Since when subjected to very strong heating and expansion the cork may lose its strength, it is often advisable to add known suitable substances such as clay to increase the strength, also the effect of such substance as a binding agent is not required in this case. Such substances strengthen the cork stone as if by a skeleton and facilitate the adhesion of the mortar in subsequent use. It has also been found, especially when producing large pieces, that it is of importance to facilitate the passage of the heating agent through the cork as much as possible. Therefore according to the present invention during the whole of the heating period the cork particles are to be kept separate. This, however, is incompatible with the simultaneous molding of the cork, that is to say with heating the cork in the inextensible mold itself, since the expansion of the cork and the resistance of the walls of the mold would cause a pressure and a diminution of the interspaces between the cork particles and so prevent free passage of the heating agent. Therefore the heating and the compression are performed in two successive steps. The heating can also be assisted by subjecting the cork to an artificial movement and so keeping it continually in uniformly loose layers. This artificial movement can be produced by a stirrer or the cork can be charged into a rotating drum. In this process also the heating vessel and the molding vessel may be separate. If the heating is not accompanied by artificial motion it may be carried out in the mold, which, however, may be left open in order to mold the piece afterward by pressure; on the other hand, when the heating is accompanied by movement the heating vessel cannot generally have the shape desired for the final product so that it is necessary to transfer the cork from the heating vessel to the mold. If the cork is agitated in the heating vessel, the heating vessel may be heated from the outside or a heating means may be passed through the vessel.

Now what I claim and desire to secure by Letters Patent is the following:

1. In a process of heating subdivided cork, agitating the cork while heating and conducting the heating operation in a surrounding body of gas with exclusion of air and the cork at a temperature above 200° C.

2. In a process of heating subdivided cork, agitating the cork while heating, and conducting the heating operation with exclusion of air while the cork is at a temperature above 200° C. by passing through the mass of cork particles a heating agent such for example as a liquid, vapor or gas.

3. In a process of heating subdivided cork, charging the cork particles into a mold having perforated walls and then passing through the mold and through the body of cork pieces therein a current of the heating agent, substantially as described.

4. In a process of heating subdivided cork, charging the cork particles loosely into a mold having perforated walls and then passing through the mold and through the body of cork particles therein a current of the heating agent, substantially as described.

5. In a process of heating subdivided cork, charging the cork particles into a mold having perforated walls and then passing a current of the heating agent through the mold and through the body of cork pieces therein by suction, substantially as described.

6. In a process of heating subdivided cork, charging the cork particles into a mold having perforated walls and then passing through the mold and through the body of cork pieces therein a heating agent until the volatile resin of the cork is expelled, substantially as described.

7. In a process of heating subdivided cork, charging the cork particles into a mold having perforated walls, then passing through the mold and through the body of cork particles therein a current of the heating agent and finally cooling the heated cork mass by passing a cooling agent through it, substantially as described.

8. In a process of making cork masses from subdivided cork, heating in a surrounding body of gas subdivided cork in a loose condition to a temperature above 200° C., charging the subdivided cork into a mold and uniting the subdivided particles into a compact body by pressure.

9. In a process of heating subdivided cork, charging the cork into a vessel, agitating the cork pieces within the vessel and passing a heating agent through the mass of cork particles while they are being agitated, substantially as described.

10. In a process of making masses of subdivided cork, heating in a surrounding body of gas subdivided cork with exclusion of air to a temperature above 200° C., agitating the cork while heating, charging the cork particles into a mold and pressing the same in the mold while heating.

In testimony, that I claim the foregoing as my invention, I have signed my name in presence of two witnesses, this nineteenth day of November, 1907.

MAX GRÜNZWEIG.

Witnesses:
 CARL GRÜNZWEIG,
 JOS. H. LEUTE.